United States Patent
Fujimaki et al.

(10) Patent No.: US 6,803,442 B2
(45) Date of Patent: Oct. 12, 2004

(54) MASTERBATCH METHOD FOR PROCESSING POLYESTER RESIN AND ARTICLES THEREOF

(75) Inventors: Takashi Fujimaki, Kanagawa (JP); Yukio Kobayashi, Tokyo (JP); Yoshitomo Urata, Kanagawa (JP); Toshio Tanaka, Kanagawa (JP)

(73) Assignee: FTEX, Incorporated, Kanagawa (JP)

( * ) Notice: Subject to any disclaimer, the term of this patent is extended or adjusted under 35 U.S.C. 154(b) by 0 days.

(21) Appl. No.: 10/297,177

(22) PCT Filed: Jun. 4, 2001

(86) PCT No.: PCT/JP01/04701

§ 371 (c)(1), (2), (4) Date: Dec. 3, 2002

(87) PCT Pub. No.: WO01/94443

PCT Pub. Date: Dec. 13, 2001

(65) Prior Publication Data

US 2003/0135015 A1 Jul. 17, 2003

(30) Foreign Application Priority Data

Jun. 5, 2000 (JP) .................................. 2000-205828

(51) Int. Cl.⁷ ............................................. C08G 63/02
(52) U.S. Cl. ................... 528/272; 264/176.1; 264/219; 525/403; 528/271
(58) Field of Search ............................ 264/176.1, 219; 528/271, 272; 525/403

(56) References Cited

U.S. PATENT DOCUMENTS

2002/0035218 A1 * 3/2002 Yoshimura et al. ......... 525/438

FOREIGN PATENT DOCUMENTS

| EP | 984027 A1 | 3/2000 |
| EP | 0984027 | * 3/2000 |
| WO | WO 98/44019 A1 | 10/1998 |

* cited by examiner

*Primary Examiner*—Terressa Boykin
(74) *Attorney, Agent, or Firm*—Sughrue Mion, PLLC

(57) ABSTRACT

The present invention provides a masterbatch method for producing a polyester resin and articles thereof; comprising reacting following materials uniformly at a temperature equal to or greater than the melting point of a polyester, the materials comprising: (1) 100 parts by weight of saturated straight-chain polyester A; (2) 1 to 10 parts by weight of binder masterbatch D comprising: a mixture containing a compound having two epoxy groups and a compound having an average number of epoxy groups of 2.1 or more; (3) 0.25 to 10 parts by weight of catalyst masterbatch G comprising: a metal carboxylate, whereby the melt viscosity of the polyester increases so that the melt flow rate (MFR) becomes 50 g/10 min or less, and the degree of swelling of the polyester increases to between 5% and 200%, thus resulting in a high-quality resin having excellent mechanical properties. The resin can be advantageously used for films, sheets, foamed materials, pipes, cushioning, heat insulators, packing materials, and so forth.

12 Claims, No Drawings

MASTERBATCH METHOD FOR PROCESSING POLYESTER RESIN AND ARTICLES THEREOF

TECHNICAL FIELD

The present invention relates to masterbatch methods for producing high-quality polyester resins having improved processability and articles thereof by uniformly subjecting a straight-chain polyester resin having relatively low molecular weight to a coupling reaction to increase the melt viscosity and the degree of swelling, using a small amount of binder masterbatch and a trace amount of catalyst masterbatch. More specifically, the present invention relates to a masterbatch method for producing a high-quality polyester resin having improved processability and articles of the polyester resin by subjecting a recycled polyethylene terephthalate-based polyester whose molecular weight and mechanical properties have been reduced to a coupling reaction to increase the molecular weight, the melt viscosity, and the degree of swelling while preventing the byproduction of gel and fisheyes.

BACKGROUND ART

In polyesters, saturated straight-chain polyesters (hereinafter, referred to as PET-based polyesters), such as polyethylene terephthalate (PET), polybutylene terephthalate (PBT), polyethylene-2,6-naphthalenedicarboxylate (PEN), and PETG, have excellent characteristics and are, therefore, widely used for fibers, films, bottles, and the like. Also, the PET-based polyesters are used extensively as high-performance resin materials in many industrial fields, such as the automotive, machine, electrical and electronic material, construction material, and container industries.

From the viewpoint of resource saving and environmental conservation, it has recently been understood that waste plastics collected from manufacturing processes and public consumer markets must be recycled. As for the PET-based polyesters, waste bottles, films, sheets, fibers, and the like have also been actively recycled accordingly. However, in these PET-based polyesters, heat treatment in molding processes is liable to significantly reduce the molecular weight thereof and to increase the number of carboxyl radicals at ends of the molecules thereof. This is a bottleneck in the development of recycling techniques of collected polyesters. The molecular weight of collected waste PET-based polyesters is lower than that of a new chip. For example, the molecular weight of flakes (fragments) of recycled PET bottles, which are generated in large quantity, is reduced to substantially half the original molecular weight. Therefore, if such PET bottles are reused as a base resin, processability is degraded. The resin results in, at the best, fibers, which can be produced even from a low-molecular-weight base resin, or low-quality sheets, and thus the resulting products do not have the quality satisfying requirements of the original PET bottles or other films and sheets. Thus, the use of recycled PET-based polyesters has narrow limits.

On the other hand, plastic articles featuring light weight, elasticity, processability, and the like have recently been used for packing containers and cushioning in large quantity. If the molecular weight and melt viscosity of the flakes of low-molecular-weight recycled PET bottles or new PET are increased, inexpensive articles can be achieved.

Some methods are known as solutions for these challenges, including methods in which solid phase polymerization is performed to restore the molecular weight; a terminal group of the polyester is allowed to react with a chain-extending agent (binder) to increase the molecular weight; or another resin, such as an elastomer, is added to compensate for the mechanical properties.

It is proposed that, as the chain-extending agent (binder), a compound having a functional group, such as isocyanate, oxazoline, epoxy, aziridine, or carbodiimide be used. However, the chain-extending agent is subjected to strong constraints from the viewpoint of reactivity, thermal stability, and stability. Applicable chain-extending agents are, therefore, limited to specific compounds. Epoxy compounds are relatively useful as the chain-extending agent, and a monoepoxy compound (Japanese Unexamined Patent Application Publication No. 57-161124) and diepoxy compounds (Japanese Patent Application laid open No. 7-166419 and Japanese Patent Application laid open Nos. 48-25074 and 60-35944) are known. However, these epoxy compounds have problems with reaction velocity, formation of gel, melt viscosity, compatibility, thermal stability, physical properties of the resulting articles, and the like, and have not yet been put into practical use.

On the other hand, a method for increasing the molecular weight of polyester is proposed (PCT Japanese laid open No. 8-508776) in which collected waste PET-based polyester is melted and mixed with a difunctional epoxy resin and hydroxyphenylalkylphosphonate having steric hindrance effects. Unfortunately, the sterically hindering hydroxyphenylalkylphosphonate is expensive though this method makes reaction velocity faster. This is a problem in practical use for industries which need low-cost recycling. Although another method has also been proposed in which rubber and an elastomer are added to the polyester, this method has problems with characteristics after drying, compatibility, thermal stability, elasticity, and the like.

In general, plastics used for various types of articles are polystyrene, polyethylene, and polypropylene having high molecular weights and high melting viscosities. The melting point of PET-based polyesters is as low as about 2,000 poise at 280° C., even if the molecular weight thereof is increased (to, for example, an intrinsic viscosity of 1.0 dl/g, a number-average molecular weight of about 17,000, and a weight-average molecular weight of about 44,000) to use for bottles and, therefore, it is difficult to form the PET-based polyester into various types of articles for many applications as in polyolefins The inventors of the present invention have proposed a method for producing a PET-based polyester resin having a long chain, blanched structure and characteristic features of having a high molecular weight, a high melt tension, a high degree of swelling and the like and an article of the PET-based resin (PCT WO 98/44019) by adding both difunctional and trifunctional epoxy compounds, acting as a small amount of binder, and a trace amount of coupling reaction catalyst to the PET-based polyester in advance, and conducting a rapid reaction for about two minutes in an extruder. In this method, however, a local reaction at the ditch of the screw and vicinity of vent the extruder where the raw and high-concentration binder and catalyst have been placed is liable to intensely produce gel as a by product, and thus continuous operation for more than several hours causes gel and fisheyes. It has been found that the quality of, for example, tubular films, thin films produced by a T-die method, and foamed sheets and pipes is liable to be degraded due to large amounts of gel and fisheyes and, therefore, the prior invention has not been perfected.

In order to solve the problem of causing gel and fisheyes resulting from the local reaction during the rapid reaction of the binder and the catalyst in an extruder, an object of the present invention is to provide a masterbatch method for producing a polyester resin having an improved processability and an article of the polyester resin in which the molecular weight of a brittle PET-based polyester of, particularly, recycled PET bottles having a relatively low molecular weight is increased, and the melt viscosity of the polyester is also increased so that various types of molding can be performed.

DISCLOSURE OF THE INVENTION

The inventors of the present invention have conducted intensive research to accomplish this object, and consequently found that the known method for producing the PET-based polyesters having a specific molecular weight and the characteristic features of high melt viscosity and large swelling and which are made suitable for tubular films, tough sheets, foamed sheets, and directly blown bottles and pipes by adding a specific epoxy resin, acting as a binder, and a coupling reaction catalyst to a saturated polyester is liable to by-produce gel resulting from a local reaction in the vicinity of high-concentrations of raw binder and high-concentrations of raw catalyst. The inventors have redoubled their effort to devise an advantageous method. As a result, they found that a masterbatch method in which masterbatches each previously diluted in a base substance are allowed to uniformly react with a saturated polyester acting as a raw material can solve the problem, with industrial advantages, and thus achieved the present invention.

Specifically, the present invention is, first, directed to a masterbatch method for producing a polyester resin, comprising the step of allowing the following materials to react uniformly:

(1) 100 parts by weight of saturated straight-chain polyester A;

(2) 1 to 10 parts by weight of binder masterbatch D comprising: 10 to 50 parts by weight of a mixture B acting as a binder containing 0 to 100 parts by weight of a compound having two epoxy groups in the molecule thereof and 100 to 0 parts by weight of a compound having an average number of epoxy groups of 2.1 or more; and 100 parts by weight of base substance C; and (3) 0.25 to 10 parts by weight of catalyst masterbatch G comprising 5 to 25 parts by weight of a metal carboxylate acting as coupling reaction catalyst E and 100 parts by weight of base substance F.

The coupling reaction is performed at a temperature more than or equal to the melting point of the polyester. Thus, the melt viscosity of the polyester increases so that the melt flow rate (MFR) is 50 g/10 min or less at 280° C. and under a load of 2.16 kgf in accordance with condition 20 of JIS K 7210, and the degree of swelling of the polyester increases to between 5% and 200%.

Second, the present invention is directed to a masterbatch method for producing an article, comprising the steps of molding a polyester resin prepared by the above-described method into pellets in advance; and molding the pellets into the articles.

Third, the present invention is directed to a masterbatch method for producing an article, comprising the step of introducing a polyester resin prepared by the above-described method to a die or a mold to form the articles immediately after the coupling reaction.

Fourth, a masterbatch method for producing a polyester resin or an article of the polyester resin according to any one of the methods described above is provided in which saturated straight-chain polyester A is a polyethylene terephthalate-based aromatic polyester having an intrinsic viscosity in the range of 0.50 to 0.90 dl/g.

Fifth, a masterbatch method for producing a polyester resin or an article of the polyester resin according to any one of the methods described above is provided in which saturated straight-chain polyester A is a recycled material prepared from a collected polyethylene terephthalate-based aromatic polyester articles.

Sixth, a masterbatch method for producing a polyester resin or an article of the polyester resin according to any one of the methods described above is provided in which the compound having two epoxy groups in the molecule thereof contained in binder B of binder masterbatch D contains at least one selected from the group consisting of aliphatic polyethylene glycol diglycidyl ether, alicyclic hydrogenated bisphenol A diglycidyl ether, and aromatic bisphenol A diglycidyl ether and early condensates of bisphenol A diglycidyl ether.

Seventh, a masterbatch method for producing a polyester resin or an article of the polyester resin according to any one of the methods described above is provided in which the compound having an average number of epoxy groups of 2.1 or more contained in binder B of binder masterbatch D contains at least one selected from the group consisting of: aliphatic trimethylolpropane triglycidyl ether, glycerin triglycidyl ether, epoxide soybean oil, and epoxide linseed oil; heterocyclic triglycidyl isocyanurate; and aromatic phenol novolac epoxy resins, cresol novolac epoxy resins, and bisresorcinol tetraglycidyl ether.

Eighth, a masterbatch method for producing a polyester resin or an article of the polyester resin according to any one of the methods described above is provided in which base substance C of binder masterbatch D contains at least one selected from the group consisting of a polyethylene terephthalate-based aromatic polyester having an intrinsic viscosity in the range of 0.50 to 0.90 dl/g, a recycled material prepared from a collected polyethylene terephthalate-based aromatic polyester articles, condensates of ethylene glycol, cyclohexanedimethanol, and terephthalic acid, polyethylene acrylate resins, and toluene.

Ninth, a masterbatch method for producing a polyester resin or an article of the polyester resin according to any one of the methods described above is provided in which coupling reaction catalyst E of catalyst masterbatch G is a composite containing at least two selected from the group consisting of lithium salts, sodium salts, potassium salts, magnesium salts, calcium salts, zinc salts, and manganese salts of stearic acid and acetic acid.

Tenth, a masterbatch method for producing a polyester resin or an article of the polyester resin according to any one of the methods described above is provided in which base substance F of catalyst masterbatch G contains at least one selected from the group consisting of a polyethylene terephthalate-based aromatic polyester having an intrinsic viscosity in the range of 0.50 to 0.90 dl/g, a recycled material prepared from a collected polyethylene terephthalate-based aromatic polyester articles, condensates of ethylene glycol, cyclohexanedimethanol, and terephthalic acid, and polyethylene acrylate resins.

Eleventh, the present invention is directed to a masterbatch method for producing polyester resin pellets, comprising the steps of: melting (1) undried saturated straight-chain polyester A at a temperature more than or equal to the melting point thereof while performing dehydration by degassing to a pressure of $13.3 \times 10^3$ Pa or less in a non-water-sealed vacuum line; allowing (2) binder masterbatch D and (3) coupling reaction catalyst masterbatch G to uniformly react together by heating. Thus, the resulting polyester resin has a melt flow rate (MFR) of 50 g/10 min or less at a temperature of 280° C. under a load of 2.16 kgf in accordance with condition 20 of JIS K 7210, and has a degree of swelling of 5% to 200%. The step of pelletizing the resulting polyester resin is also performed.

Twelfth, the present invention is directed to a masterbatch method for producing an article, comprising the steps of: melting (1) undried saturated straight-chain polyester A at a temperature more than or equal to the melting point thereof while performing dehydration by degassing to a pressure of $13.3 \times 10^3$ Pa or less in a non-water-sealed vacuum line; allowing (2) binder masterbatch D and (3) coupling reaction catalyst masterbatch G to uniformly react together by heating. Thus, the resulting polyester resin has a melt flow rate (MFR) of 50 g/10 min or less at a temperature of 280° C. under a load of 2.16 kgf in accordance with condition 20 of JIS K 7210, and has a degree of swelling of 5% to 200%. The step of introducing the resulting polyester to a die or a mold to form the articles immediately after the foregoing coupling reaction is also performed.

BEST MODE FOR CARRYING OUT THE INVENTION

In the present invention, saturated straight-chain polyester A of component (1), acting as a raw material prepolymer, is synthesized from a dicarboxylic acid component and a glycol component, or from a hydroxycarboxylic acid. Exemplary dicarboxylic acid components include aromatic dicarboxylic acids, such as terephthalic acid, isophthalic acid, naphthalenedicarboxylic acid, diphenylcarboxylic acid, diphenylsulfonedicarboxylic acid, diphenoxyethanedicarboxylic acid, diphenyletherdicarboxylic acid, methylterephthalic acid, and methylisophthalic acid; and aliphatic or alicyclic dicarboxylic acid, such as succinic acid, adipic acid, sebacic acid, decanedicarboxylic acid, dodecanedicarboxylic acid, and cyclohexanedicarboxylic acid. In these dicarboxylic acids, aromatic dicarboxylic acids, particularly terephthalic acid and 2,6-naphthalenedicarboxylic acid, are preferable.

Exemplary glycol components include ethylene glycol, trimethylene glycol, tetramethylene glycol, hexamethylene glycol, decamethylene glycol, neopentyl glycol, cyclohexanedimethanol, polyoxyethylene glycol, polyoxypropylene glycol, and polyoxytetramethylene glycol. In these glycols, ethylene glycol, tetramethylene glycol, cyclohexanedimethanol are preferable.

Exemplary hydroxycarboxylic acids include α-hydroxycaproic acid, hydroxybenzoic acid, and hydroxyethoxybenzoic acid.

Practical examples of saturated straight-chain polyester A include polyethylene terephthalate (PET), polybutylene terephthalate (PBT), polyethylene-2,6-naphthalate (PEN), PETG (produced by Eastman), and their copolymers. Since polyethylene terephthalate (PET) has been mass-produced worldwide and the recycling system thereof is being completed, PET is particularly suitable for the raw material prepolymer of the present invention.

Preferably, saturated straight-chain polyester A used as the prepolymer of the present invention has an intrinsic viscosity (IV value) of 0.50 dl/g (this value corresponds to a melt flow rate (MFR) of about 210 g/10 min or less at 280° C. and under a load of 2.16 kgf in accordance with JIS K 7210), and more preferably 0.60 dl/g or more (an MFR of about 130 g/10 min or less) when the intrinsic viscosity is measured at 25° C. after dissolving the prepolymer in the 1,1,2,2-tetrachlorethane:phenol (1:1) solvent mixture. If the intrinsic viscosity is less than 0.50 dl/g, it is difficult to increase the molecular weight and the melt viscosity even according to the present invention. The resulting polyester is likely not to have excellent processing characteristics of foaming. The intrinsic viscosity does not have a specific upper limit, but preferably, it is limited to 0.90 dl/g (MFR of about 25 g/10 min or more), and more preferably to 0.80 dl/g (MFR of about 45 g/10 min or more).

In practice, flakes or pellets of PET-based polyester bottles collected in large quantity are often used as the prepolymer. PET bottles generally have relatively high intrinsic viscosities, and accordingly, the intrinsic viscosity of collected PET bottles is high, and is generally 0.60 to 0.80 dl/g (MFR of 130 to 45 g/10 min), and particularly 0.65 to 0.75 dl/g (MFR of 100 to 55 g/10 min).

When recycled polyester articles are used, the polyester articles may be fibers, films, bottles, or other articles, and the polyester may contain a small amount of another polymer, such as polyolefin or polyacrylic ester. Also, the polyester may contain a small amount of additives such as a filler, a pigment, and a dye. In general, flakes (fragments) of recycled PET bottles are supplied in a paper bag containing 20 kg or a flexible container containing 500 kg, and the flakes generally contains 3,000 to 6,000 ppm (0.3% to 0.6% by weight) of water.

Binder B of component (2) of the present invention is a compound having two epoxy groups or, in some cases, an average number of epoxy groups of 2.1 or more. Exemplary compounds having two epoxy groups on average include aliphatic compounds, such as polyethylene glycol diglycidyl ether, polypropylene glycol diglycidyl ether, tetramethylene glycol diglycidyl ether, 1,6-hexamethylene glycol diglycidyl ether, neopentyl glycol diglycidyl ether, and glycerin diglycidyl ether; alicyclic compounds, such as hydrogenated bisphenol A diglycidyl ether, hydrogenated isophthalate diglycidyl ester, 3,4-epoxycyclohexylmethyl-3,4-epoxycyclohexanecarboxylate, and bis(3,4-epoxycyclohexyl)adipate; heterocyclic compounds, such as diglycidyl hydantoin and diglycidyl oxyalkyl hydantoin; and aromatic compounds, such as bisphenol A diglycidyl ether, early condensate of bisphenol A diglycidyl ether, diphenylmethane diglycidyl ether, terephthalate diglycidyl ester, isophthalate diglycidyl ester, and diglycidyl aniline.

Exemplary compounds B having three epoxy groups on average include aliphatic compounds, such as trimethylolpropane triglycidyl ether and glycerin triglycidyl ether; heterocyclic compounds, such as triglycidyl isocyanurate, triglycidyl cyanurate, and triglycidyl hydantoin; and aromatic compounds, such as triglycidyl para- or meta-aminophenol.

Exemplary compounds B having four epoxy groups on average include tetraglycidylbenzylethane, sorbitol tetraglycidyl ether, tetraglycidyl diaminophenylmethane, and tetraglycidyl bisaminomethylcyclohexane.

Compound B having a mixed decimal number of epoxy groups between 2.1 and several pieces on average may be phenol novolac epoxy resins and cresol novolac epoxy resins. Dow Chemical Company places exemplary compounds B having 2.2, 3.6, 3.8 and 5.5 epoxy groups on average on the market, and these are available.

In order to be used for food packaging, the epoxy resins must be very safe. Preferably, epoxide soybean oil (Adekasizer O-130P), epoxide linseed oil (Adekasizer O-130P), or epoxide fatty alkyl ester (Adekasizer D-178)

manufactured by Asahi Denka Co., Ltd. and certified by the FDA, the heat-stable epoxy resin NC-3000S (negative in the AIMS test) manufactured by Nippon Kayaku Co., Ltd., or the like are used.

The content of compound B of component (2) having epoxy groups of the present invention is in the range of 0.1 to 5 parts by weight to 100 parts by weight of the saturated straight-chain polyester of component (1). Preferably, it is in the range of 0.4 to 1.0 parts by weight. If the content is less than 0.1 parts by weight, compound B does not sufficiently serve to extend chains, and the molecular weight and the melt viscosity do not increase enough. Consequently, the processability is not improved. In contrast, if the content is more than 5 parts by weight, the fundamental and mechanical characteristics and the elasticity of the resulting articles decrease by the effect of plasticizer, or large amounts of gel and fisheyes bring out. In general, the content depends on the type of component (2), and particularly on the molecular weight. For example, if an epoxy resin having a low molecular weight and an epoxy equivalent of 100 to 200 g/eq is allowed to react with a saturated straight-chain polyester having a high intrinsic viscosity of 0.90 dl/g, a component B content of 0.1 parts by weight will suffice. If an epoxy resin having a high molecular weight and an epoxy equivalent of 2000 g/eq is allowed to react with a saturated straight-chain polyester having a low intrinsic viscosity of 0.50 dl/g, a component B content of about 5 parts by weight may be necessary.

The present invention is characterized in that a mixture containing 0% to 100% by weight of a compound having two epoxy groups and 100% to 0% by weight of a compound having an average number of polyfunctional epoxy groups of 2.1 or more is used as binder B, thereby increasing the molecular weight of the saturated straight-chain polyester and introducing a long-chain branch. Thus, a PET-based polyester having a high melt viscosity and a high degree of swelling, which are necessary to form tubular films, direct blown bottles, highly foamed materials, pipes, and the like, and various articles of the PET-based polyester can be achieved. According to the present invention, by increasing the alternatives and usage of compound B containing a compound having 2 polyfunctional epoxy groups and a compound having an average number of polyfunctional epoxy groups of 2.1 or more, the number of long branched chains, the molecular weight, the melt viscosity, the degree of swelling, and the like can be controlled to a level at which various types of molding can be conducted. The polyester of the present invention allows molecular chains to entangle each other because of the introduction of a long-chain branch. Thus, the degree of swelling and the melt viscosity can be arbitrarily increased even if the intrinsic viscosity is relatively low and in the range of 0.6 to 0.8 dl/g.

Preferably, in the present invention, a mixture of 0% to 99% by weight of the compound having two epoxy groups in the molecule thereof and 1% to 100% by weight of the compound having an average of at least 2.1 of polyfunctional epoxy groups in the molecule thereof is used. The compound having two epoxy groups mainly serves to increase the molecular weight of the saturated straight-chain polyester and reduce the MFR. On the other hand, the compound having an average of at least 2.1 of polyfunctional epoxy groups also serves to increase the molecular weight and reduce the MFR. In addition, it mainly serves to form a long-chain branch to increase the degree of swelling and the melt viscosity. As a result, tubular films, directly blown bottles, tough sheets, highly foamed materials, and pipes can be arbitrarily produced. Under present circumstances, for tubular films and pipes and directly blown bottles, for example, a PET-based polyester having a relatively small number of long-chain branches, an MFR of 3 g/10 min or less, and about 20% to 50% of swelling is preferable. For highly expanded foamed materials, for example, a PET-based polyester having a large number of long-chain branches, an MFR of 3 to 10 g/10 min, and about 50% to 200% of swelling is preferable. For tough sheets capable of two times or more deeper stretching than commercially available A-PET, for example, a PET-based polyester having a relatively large number of long-chain branches, an MFR of 5 to 20 g/10 min, and about 50% to 100% of swelling is preferable.

One of the most striking characteristics of the present invention is that binder masterbatch D prepared by previously diluting binder B with base substance C is used in order to prevent the raw material polyester from locally reacting with raw and high-concentration binder B, as in the manner in which, for example, homogeneous kuzu-yu is prepared by pouring hot water into kuzu starch previously dispersed in water. As base substance C, a polyethylene terephthalate-based aromatic polyester having an intrinsic viscosity of 0.50 to 0.90 dl/g, recycled polyester from collected polyethylene terephthalate-based aromatic polyester articles, PETG (condensate of ethylene glycol, cyclohexanedimethanol, and terephthalic acid, produced by Eastman), polyethylene, polyethylene acrylate resins (J-REX EEA and LEXPEARL produced by Japan Polyolefins Co., Ltd.), toluene, benzene, xylene, and the like may be used. If the resulting articles needs to be transparent, an organic solvent, such as PET-based polyester, PETG (condensate of ethylene glycol, cyclohexanedimethanol, and terephthalic acid, produced by Eastman), toluene, benzene, or xylene, may be used. If the resulting articles does not need to be transparent, polyethylene, polyethylene acrylate resins (J-REX EER and LEXPEARL produced by Japan Polyolefins Co., Ltd.) or the like may be used.

Binder masterbatch D generally contains 10 to 50 parts by weight of binder B and 100 parts by weight of base substance C, and preferably 15 to 20 parts by weight of binder B and 100 parts by weight of base substance C. A binder B content of 10 parts by weight or less degrades the effect of masterbatch D and increases cost. A binder B content of 50 parts by weight or more disadvantageously makes it difficult to prepare masterbatch D, and is liable to cause gel to form during the coupling reaction.

Binder masterbatch D is generally used in an amount of 1 to 10 parts by weight relative to 100 parts by weight of saturated straight-chain polyester A, and more preferably in an amount of about 5 parts by weight, which improves ease of dispersing and mixing.

In order to prepare binder masterbatch D, a common single screw extruder, a twin screw extruder, a kneader-ruder, or the like having an L/D ratio of about 10 to 45 may be used. A predetermined amount of the binder is supplied from the side to extrude a strand from a die while a predetermined amount of resin of base substance C is allowed by the extruder to flow at a temperature 10 to 20° C. higher than the melting point of the base substance. After being water-cooled, the strand is cut into pellets. If the binder is liquid, it is supplied by a metering pump through the vent of the extruder or a forced supply line. If the binder is semisolid or solid, it is supplied by a metering pump while a storage container and a forced supplying line are heated. Alternatively, it may be dissolved in benzene, toluene, xylene, or the like to a predetermined concentration in advance, and is, for example, diluted 2 to 10 times. Then, the diluted binder is supplied. Next, the resulting pellets of the binder masterbatch D are dried at a temperature equal to or lower than the melting point of base substance C and at which the pellets do not adhere to each other, for example, in the range of 50 to 140° C., and preserved in a three-layered moisture-proof bag composed of aluminium, polyethylene, and paper.

Coupling reaction catalyst E of component (3) contains at least one selected from the group consisting of (a) alkali metal carboxylates, (b) alkaline-earth metal carboxylates, and (c) aluminium, zinc, and manganese carboxylates. The metals contained in the metal carboxylates include alkali metals, such as lithium, sodium, and potassium; alkaline-earth metals, such as magnesium, calcium, strontium, and barium; and other metals, such as aluminium, zinc, and manganese.

The carboxylic acids of the carboxylates include aliphatic carboxylic acids having a carbon number in the range of 1 to 20, and particularly in the range of 1 to 10; alicyclic carboxylic acids having a carbon number in the range of 3 to 12; and aromatic carboxylic acids having a carbon number in the range of 7 to 20. Specifically, the carboxylic acids include acetic acid, propionic acid, butyric acid, caproic acid, adipic acid, stearic acid, palmitic acid, montanic acid, cyclohexanecarboxylic acid, benzoic acid, and phthalic acid. In particular, easily available, inexpensive metal acetates and metal stearates (homogeneous catalysts) having a melting point lower than that of the raw material polyester are preferable.

More preferably, the coupling reaction catalyst E is a composite of metal carboxylates and masterbatch G containing these metal carboxylates. It has been found that metal carboxylates are not always suitable for preparing the polyester of the present invention when they are used separately. For example, while lithium stearate significantly reduces MFR, the catalytic activity thereof is low and, therefore, cannot complete a coupling reaction and results in a strand hard to draw. Sodium stearate has a high catalytic activity and therefore can complete a coupling reaction, thus resulting in a strand easy to draw (having a nucleation function); however, it changes the target polyester color to yellow. Also, calcium stearate has the same functions as lithium stearate and results in a colorless, clear polyester, but the catalytic activity thereof is further lower. Manganese acetate has a catalytic activity higher than that of sodium stearate and therefore can complete a coupling reaction, thus resulting in a strand easy to draw (having a nucleation function); however, it further changes the target polyester color to red brown.

It is therefore preferable that the coupling reaction catalyst be a composite. As for a binary catalyst, catalyst E may, for example, be 20/80 to 50/100 of lithium stearate/calcium stearate, 20/80 to 50/100 of sodium stearate/calcium stearate, 20/100 to 50/100 of manganese acetate/lithium stearate, or 20/100 to 50/100 of manganese acetate/calcium stearate. As for a ternary catalyst, catalyst E may, for example, be a composite catalyst, such as 50/50/100 of lithium stearate/sodium stearate/calcium stearate, 50/50/100 of lithium stearate/sodium acetate/calcium stearate, or 50/50/100 of lithium stearate/manganese acetate/calcium stearate, or a masterbatch containing the composite catalyst and base substance F.

The carboxylate content of coupling reaction catalyst E, including lithium salts, sodium salts, calcium salts, and manganese salts, is in the range of 0.01 to 0.5 parts by weight relative to saturated straight-chain polyester A of component (1). Preferably, it is in the range of 0.05 to 0.2 parts by weight. If the content is less than 0.01 parts by weight, the catalytic activity becomes low, and the coupling reaction may not be completed, consequently not increasing the molecular weight. A content more than 0.5 parts by weight may by-produce gel or rapidly increase the melt viscosity due to a local reaction, and thus cause hydrolysis or other problems in the extruder or during a molding process.

Another of the most striking characteristics of the present invention is that, in order to prevent a local reaction at the vicinity of catalyst E, masterbatch G is used with base substance F used as a diluent. As base substance F, a polyethylene terephthalate-based aromatic polyester having an intrinsic viscosity of 0.50 to 0.90 dl/g, recycled polyester from collected polyethylene terephthalate-based aromatic polyester articles, PETG (condensate of ethylene glycol, cyclohexanedimethanol, and terephthalic acid, produced by Eastman), polyethylene, polyethylene acrylate resins (J-REX EEA and LEXPEARL produced by Japan Polyolefins Co., Ltd.), polyacrylate resins (including copolymers), and the like may be used, substantially as in base substance C. If the resulting articles needs to be transparent, a PET-based polyester, PETG (condensate of ethylene glycol, cyclohexanedimethanol, and terephthalic acid, produced by Eastman), or polyacrylate resins (including copolymers) may be used. If the resulting articles does not need to be transparent, polyethylene, polyethylene acrylate resins (J-REX EEA and LEXPEARL produced by Japan Polyolefins Co., Ltd.) or the like may be used.

Catalyst masterbatch G generally contains 5 to 25 parts by weight of catalyst E and 100 parts by weight of base substance F, and preferably 7.5 to 12.5 parts and more preferably 8 to 10 parts by weight of catalyst E and 100 parts by weight of base substance F. A catalyst E content of 5 parts by weight or less degrades the effect of masterbatch G and increases cost. A catalyst E content of 25 parts by weight or more disadvantageously makes it difficult to prepare the masterbatch G, and is liable to by-produce gel during the coupling reaction. In addition, it disadvantageously causes resins to hydrolyze during processing processes.

Catalyst masterbatch G is generally used in an amount of 0.25 to 10 parts by weight relative to 100 parts by weight of saturated straight-chain polyester A, and more preferably in an amount of 0.5 to 2 parts by weight, which improves ease of dispersing and mixing.

Coupling reaction catalyst E of component (3) may contain additives, such as a promoter, a nucleation agent, and a crystallization accelerator, if necessary. The additives include, for example, halides, carbonates, and bicarbonate of alkali metals and alkaline-earth metals, such as lithium chloride, potassium iodide, and potassium carbonate; aryl or alkyl-substituted phosphines, such as tributylphosphine, trioctylphosphine, and triphenylphosphine; and alkali and alkaline-earth metal salts of saturated fatty acids, such as butyric acid, valeric acid, caproic acid, lauric acid, myristic acid, palmitic acid, stearic acid, behenic acid, and montanic acid, and unsaturated fatty acids, such as crotonic acid, oleic acid, and elaidic acid, including lithium salts, sodium salts, potassium salts, beryllium salts, magnesium salts, calcium salts, strontium salts, and barium salts. These additives also may be used as a masterbatch in combination with base substance F.

In addition to polyester A of component (1), compound B containing epoxy groups and base substance C of component (2), and metal carboxylate E and base substance F of component (3), the polyester resin composition of the present invention may further contain a nucleation agent or a filler, such as talc, calcium carbonate, calcium oxide, kaolin, alumina, or aluminium hydroxide; a reinforcing agent, such as glass fiber, carbon fiber, aramid fiber, or whisker; and a pigment, such as carbon black, antimony oxide, molybdenum disulfide, or titanium oxide. Also, the polyester resin composition may contain another colorant, a stabilizer, a UV absorbent, an antioxidant, a viscosity adjuster, an antistatic agent, a conducting agent, a fluidizing agent, a mold release agent, another cross-linker, another resin, and the like, if necessary.

For example, antioxidants include hindered phenol antioxidants, such as p-t-butylhydroxytoluene and p-t-butylhydroxyanisole, sulfur antioxidant, such as distearyl thiodipropionate and dilauryl thiodipropionate. Heat stabilizers include triphenyl phosphite, trilauryl phosphite, and trisnonylphenyl phosphite. UV absorbers include p-t-butylphenyl salicilate, 2-hydroxy-4-thoxybenzophenone, 2-hydroxy-4-methoxy-2'-carboxybenzophenone, and 2,4,5-trihydroxybutyrophenone. Antistatic agents include N,N-bis(hydroxyethyl)alkylamine, alkylarylsulfonate, and alkylsulfonate. Flame retardants include hexabromocyclododecane, tris-(2,3-dichloropropyl)phosphate, and pentabromophenylallyl ether.

Productiones of producing the polyester resin of the present invention applying a masterbatch method will now be described. Saturated straight-chain polyester A of component (1) may be a new normal resin or flakes, grains, powder, chips, melt, or the like of recycled PET bottles. Raw materials of main component polyester prepolymer are preferably dried at 90 to 140° C. for several hours to over ten hours in dehumidified air or hot air. However, if a specific twin screw extruder is used in a high vacuum, drying is not necessary. Three components including the raw material and the masterbatches are mixed with a mixer, such as a tumble or a Henschel mixer in advance, and are then supplied to, for example, a high-vacuum twin screw extruder or a single screw extruder to form pellets. Alternatively, the components may be supplied to a processing apparatus directly connected to the extruder and are, thus, molded into an article at one time.

In this instance, the temperature for heating and melting is preferably between the melting pint of the polyester and 350° C., from the viewpoint of controlling the reaction. A temperature of 300° C. or less is particularly preferable, and a temperature of more than 350° C. is likely to cause the polyester to change color or thermally decompose.

These three components may be simultaneously mixed. Otherwise raw material A of component (1) and masterbatch D acting as binder B of component (2) may be previously mixed, and then masterbatch G acting as catalyst E of component (3) is added from the side. Raw material A of component (1) and masterbatch G acting as catalyst E of component (3) may be previously mixed, and then masterbatch D acting as binder B of component (2) is added from the side. Even if the raw material is not dried, the three components may be mixed and added at one time.

As a reactor for heat melting, a single screw extruder, a twin screw extruder, a two-stage extruder which is a combination of these two extruders, or a kneader-ruder may be used, or a self-cleaning type twin screw reactor, which is used for polycondensation of PET-based polyester resins, may be used. Since the high-temperature reaction for producing the polyester resin of the present invention is conducted in the extruder for a short period of about 1 to 10 minutes, preferably, the L/D ratio of the extruder is in the range of about 30 to 50, and particularly in the range of 38 to 45.

In general, it is preferable that the residence time be short, and, for example, between 30 seconds and 60 minutes though it depends on the performance of the extruder. In particular, a residence time in the range of 1.5 to 5 minutes helps increase the molecular weight of saturated straight-chain polyester A rapidly, thus reducing the number of terminal carboxyl groups rapidly. This is probably because coupling reaction catalyst E facilitates the coupling reaction between the terminal carboxyl groups of raw material polyester A and the epoxy groups of binder B containing polyfunctional epoxy components, so that the polyfunctional epoxy components help polyester molecules combine with each other to extend or branch the molecular chains and thus increase the molecular weight.

If only coupling reaction catalyst E is added to polyester A and heat melting is performed, the molecular weight does not increase, nor does the number of terminal carboxyl groups decrease. If only the polyfunctional epoxy compounds contained in component B are added and heat melting is performed, the molecular weight does not increase in a short time because the reaction is slow. Only by allowing three components (1), (2), and (3) to react in the masterbatches containing base substances C and F, followed by extrusion, the molecular weight, the melt viscosity, and the degree of swelling can be remarkably increased and, thus, a resin and an article having uniform quality can be achieved with enhanced reproducibility.

In general, it is preferable that the recycled PET bottle flakes and new polyester resin to be used in the above-described reactor be dried, in advance, by hot air at 110 to 140° C. to reduce the moisture to between 100 and 200 ppm, or dried by dehumidified air to reduce the moisture to 50 ppm or less. Polyester resins adsorb moisture in air and usually contain 3,500 to 6,000 ppm (0.35% to 0.60% by weight) of moisture, depending on the environmental humidity. Drying as in the above-described manner helps accomplish the object of the present invention with reliability.

If undried recycled PET bottle flakes or undried new polyester resin is used as the raw material, the vacuum line of the twin screw extruder is sealed with a non-water substance, that is, oil. The degree of vacuum of the first vent is set at $13.3 \times 10^3$ Pa (100 mmHg) or less, preferably at $2.6 \times 10^2$ Pa (20 mmHg) or less, and more preferably at $0.4 \times 10^2$ Pa (3 mmHg) or less, and thus the moisture can be removed by vacuum degassing immediately after the polyester resin is melted.

The polyester resin of the present invention may be subjected to processing in accordance with a prior invention (PCT WO 98/44019). Specifically, the processing temperature is set in the range of 260 to 290° C.

EXAMPLES

The present invention will be further illustrated with reference to Examples.

The polyester of the present invention was subjected to measurements of intrinsic viscosity (IV value), MFR (melt flow rate), the degree of swelling (dilatation), molecular weight, and melt viscosity. The measurements were conducted as follows.

(1) Intrinsic Viscosity

Using a solvent mixture containing identical amounts of 1,1,2,2-tetrachloroethane and phenol, the measurement was conducted at 25° C. with a Cannon-Fenske viscometer.

(2) MFR

In accordance with condition 20 of JIS K 7210, the measurement was conducted at a temperature of 280° C. and under a load of 2.16 kg.

(3) Degree of Swelling

Using a melt indexer for measuring MFR, samples were allowed to flow and droop at a temperature of 280° C. and under a load of 2.16 kg until they drooped 2.0 cm, followed by cutting off. The diameter at a position 5.0 mm from the bottom edge of the samples was measured, and the degree of swelling was derived from the following equation. The measurement was performed several times for each sample and the average value of the measurement was used. The value "2.095" in the following equation represents the diameter of the nozzle of the melt indexer for MFR measurement.

Degree of swelling (%)=[(average diameter−2.095)/2.095]×100

(4) Molecular Weight

The measurement was performed by a GPC method, using a main unit SYSTEM-21 and two columns Shodex KF-606M (for both sample and reference), each manufactured by Showa Denko K.K.

Solvent: hexafluoroisopropyl alcohol column temperature: 40° C.

Injection amount: 20 $\mu$L Flow rate: 0.6 ml/min

Polymer content: 0.15% by weight

Detector: Shodex RI-74, molecular weight conversion standard: PMMA (Sodex M-75)

(5) Melt Viscosity

Using the DynAlyser DAR-100 manufactured by REOLOGICA in Sweden, the measurement was performed by applying torsional vibration between hot plates to sample pieces 2 cm in length and width and 2 mm in thickness at 280° C. in an atmosphere of nitrogen.

Production Examples 1 to 5 of Masterbatches
Production Examples of Binder Masterbatches D1 to D5

Using a twin screw extruder, manufactured by Berstorff, having an opening diameter of 43 mm and an L/D ratio of 43 and evacuated by three-stage water-sealing, 50 parts by weight of clear flakes (prepared from recycled PET bottles, having a intrinsic viscosity of 0.725 dl/g and a MFR of 56 g/10 min) produced by Yono PET Bottle Recycle Co., Ltd. dried by hot air at 120° C. for about 12 hours and 50 parts by weight of PETG 6763 (IV: 0.73, density: 1.27) supplied in a dried bag and produced by Eastman were extruded at a set temperature of 260° C., a screw rotation of 200 rpm, a first vent pressure of about −600 mmHg, a third vent pressure of about −670 mmHg, and a self-feeding rate of 30 kg/h. At the same time, 15 parts by weight of ethylene glycol diglycidyl ether (Epolight 40E produced by Kyoeisha Kagaku Co., Ltd., epoxy equivalent: 135 g/eq, lemon yellow liquid), which is a difunctional epoxy compound, was injected from the second vent with a metering pump to serve as a binder (Production Example 1, binder masterbatch D1).

In the same manner, 15 parts by weight of a mixture of 75 parts by weight of difunctional ethylene glycol diglycidyl ether and 25 parts by weight of trifunctional trimethylolpropane triglycidyl ether (Epolight 100MF produced by Kyoeisya Kagaku Co., Ltd., epoxy equivalent: 150 g/eq, lemon yellow liquid) was injected with a metering pump to serve as a binder (Production Example 2, binder masterbatch D2). In the same manner, 15 parts by weight of a mixture of 50 parts by weight of ethylene glycol diglycidyl ether and 50 parts by weight of trifunctional trimethylolpropane triglycidyl ether was injected with a metering pump (Production Example 3, binder masterbatch D3). In the same manner, 15 parts by weight of a mixture of 25 parts by weight of ethylene glycol diglycidyl ether and 75 parts by weight of trifunctional trimethylolpropane triglycidyl ether was injected with a metering pump (Production Example 4, binder masterbatch D4). In the same manner, 15 parts by weight of trifunctional trimethylolpropane triglycidyl ether was injected with a metering pump (Production Example 5, binder masterbatch D5).

Five strands extruded from die openings of 3.5 mm in diameter were cooled down in water, and were cut into pellets with a rotary cutter. The resulting pellets in an amount of 100 kg each were dried at 140° C. for about 0.5 hours and subsequently at 120° C. for about 12 hours by hot air, and were then preserved in a moisture-proof bags.

Production Examples 6 and 7 of Masterbatches
Production Examples of Catalyst Masterbatches G1 and G2

Using a twin screw extruder, manufactured by Berstorff, having a diameter of 43 mm and an L/D ratio of 43 and evacuated by three-stage water-sealing, 50 parts by weight of a dried clear flake (prepared from recycled PET bottles, having a intrinsic viscosity of 0.725 dl/g and a MFR of 56 g/10 min) produced by Yono Pet Bottle Recycle Co., Ltd.; 50 parts by weight of dried PETG 6763 (IV: 0.73, density: 1.27) produced by Eastman; and a composite catalyst containing 2.5 parts by weight of lithium stearate, 2.5 parts by weight of sodium stearate, and 5.0 parts by weight of calcium stearate were mixed in a tumbler (Production Example 6, composite catalyst masterbatch G1). While the sample was being extruded at a set temperature of 260° C., a screw rotation of 200 rpm, a first vent pressure of about −630 mmHg, a third vent pressure of about −730 mmHg, and a self-feeding rate of 30 kg/h, five strands from die openings of 3.5 mm in diameter were cooled down in water, and were cut into pellets with a rotary cutter. Each type of resulting pellets in an amount of 10 kg were dried at 140° C. for about 1 hour and subsequently at 120° C. for about 12 hours by hot air, and were then preserved in a moisture-proof bag.

In the same manner, 50 parts by weight of a dried clear flake, 50 parts by weight of PETG 6763 produced by Eastman, a composite catalyst containing 2.5 parts by weight of lithium stearate and 5.0 parts by weight of calcium stearate, and 2.5 parts by weight of talc acting as a nucleation agent were mixed in a tumbler (Production Example 7, composite catalyst masterbatch G2).

Example 1
Formation of a Film by Inflation Techniques, Using Pellets of a Polyester (P1) Having a Low-Long Chain Blanches Prepared by Adding Binder Masterbatch D1 Containing 100% by Weight of a Compound Having Two Epoxy Groups and Catalyst Masterbatch G1

Using a tumbler, 100 parts by weight of undried clear flakes (prepared from recycled PET bottles, having an intrinsic viscosity of 0.725 dl/g and a MFR of 56 g/10 min) produced by Yono PET Bottle Recycle Co., Ltd.; 5 parts by weight of the binder masterbatch (D1) of Production Example 1; and 4.0 parts by weight of the composite catalyst masterbatch (G1) of Production Example 6 containing 50 parts by weight of lithium stearate, 50 parts by weight of sodium stearate, and 100 parts by weight of calcium stearate were mixed. While the sample was being extruded at a set temperature of 280° C., a number of screw rotation of 100 rpm, a first vent pressure of about −755 mmHg, a second and third vent pressure of about −690 mmHg, and a self-feeding rate of 30 kg/h with a twin screw extruder PCM-46 manufactured by Ikegai Corporation having an opening diameter of 46 mm and an L/D ratio of 35 and evacuated by three-stage oil-sealing, five strands extruded from die openings of 3 mm in diameter were cooled down in water, and were cut into pellets with a rotary cutter. The resulting pellets were dried at 120° C. for about 12 hours and were preserved in a moisture-proof bag.

The resulting polyester resin pellets (P1) having a small number of long-chain branches exhibited an intrinsic viscosity of 0.85 dl/g, a MFR of 14.5 g/10 min, a degree of swelling of 45%, and a melt viscosity of 1,300 Pa·s.

The polyester resin pellets (P1) having a small number of branched chains taken from the moisture-proof bag were subjected to molding with a LDPE inflation film-forming apparatus manufactured by Topy Industries, Ltd. operated by a single screw and having an opening diameter of 50 mm and an L/D ratio of 32 under the conditions of a die diameter of 100 mm, a lip gap of 1.0 mm, a temperature of 270° C., and an blow ratio of 2.9. Thus, a transparent film having a thickness of about 30 microns was obtained. This film barely exhibited any by-production of gel and fisheyes in comparison with the known method where neither a binder masterbatch nor a composite catalyst is used. In contrast, in formation using recycled PET bottle flakes, the sample flowed out from the outlets of a die like water, consequently not resulting in a film.

Example 2
Direct Formation of Sheet While a Polyester (P2) Having a Middle Long-Chain Branches was Prepared by Adding Binder Masterbatch D2 Containing 75% by Weight of a Compound Having Two Epoxy Groups and 25% by Weight of a Compound Having Three Epoxy Groups and a Catalyst Using a tumbler, 100 parts by weight of an undried clear flakes (prepared from recycled PET bottles, having an intrinsic viscosity of 0.726 dl/g and a MFR of 52 g/10 min) produced by With PET Bottle Recycle Co., Ltd.; 2.5 parts by weight of the binder masterbatch (D2) of Example 2; and powder composite catalyst containing 0.1 parts by weight of lithium stearate, 0.05 parts by weight of sodium stearate, and 0.05 parts by weight of calcium stearate were mixed. A twin screw extruder for the first stage having an opening diameter of 46 mm and an L/D ratio of 35, evacuated by three-stage oil-sealing, and being set at a temperature of 280° C., a screw rotation of 100 rpm, a first vent pressure of about −755 mmHg, a second and third vent pressure of about 690 mmHg, and a self-feeding rate of 60 kg/h; a single screw extruder PS-65 for the second stage having an opening diameter of 65 mm and an L/D ratio of 25, being set at a temperature of 270° C., a screw rotation of 85 rpm; a T die having a width of 650 mm and a lip gap of 1.5 mm; and a horizontal-type, and three-stage vertical oil-heating chill roll were used.

Colorless, transparent sheets of 580 mm in width and 0.8 mm in thickness were obtained by horizontal drawing. In the sheets, gel and fisheye were barely present in comparison with the known method in which neither a binder masterbatch nor a composite catalyst is used. The MFR of the resulting sheet was 16. In tensile tests (50 mm/min) using a number 2 dumbbell specified in JIS, the sheets exhibited yield strengths of 575 kgf/cm$^2$ (MD) and 587 kgf/cm$^2$ (TD), break strengths of 587 kgf/cm$^2$ (MD) and 504 kgf/cm$^2$ (TD), break elongations of 370% (MD) and 670% (TD), and tensile modulus of 280 kgf/mm$^2$ (MD) and 250 kgf/mm$^2$ (TD).

Examples 3 to 6
Preparation of Pellets of High-molecular-weight Polyester Resins (P3 to P6) by Adding Any One of Masterbatches D2 to D5 Containing Difunctional and Trifunctional Aliphatic Binders and Composite Catalyst Masterbatch G1

Three types of materials were mixed in a tumbler. The materials were 100 parts by weight of undried clear flakes (prepared from recycled PET bottles, having an intrinsic viscosity of 0.725 dl/g, a MFR of 56 g/10 min, and a melt viscosity of 67 Pa·s, quality specification: respectively under 30 ppm of aluminium and metals, 40 ppm of PVC flakes, 450 ppm of pigment flakes, 30 ppm of polyolefin, and 90 ppm of a label and others) produced by Yono PET Bottle Recycle Co., Ltd., 7.0 parts by weight of any one of the binder masterbatches (D2 to D5) of respective Production Examples 2 to 5, and 1.1 parts by weight of the composite catalyst masterbatch (G1) of Production Example 1 containing 50 parts by weight of lithium stearate, 50 parts by weight of sodium stearate, and 100 parts by weight of calcium stearate. While samples were being extruded at a set temperature of 280° C., a screw rotation of 100 rpm, a first vent pressure of about −750 mmHg, a second and third vent pressure of about 755 mmHg, and a self-feeding rate of 50 kg/h with a twin screw extruder PCM-70 manufactured by Ikegai Corporation having an opening diameter of 70 mm and an L/D ratio of 37 and evacuated by three-stage oil-sealing, ten strands extruded from die openings of 2 mm in diameter were cooled down in water, and were cut into pellets with a rotary cutter. Each type of resulting pellets in an amount of 100 kg was dried at 120° C. for about 12 hours by hot air, and was preserved in a moisture-proof bag.

These types of resulting high-molecular-weight PET resin pellets exhibited the following respective MFRs and melt viscosities (280° C.): 6.5 g/10 min and 5,500 Pa·s (P3); 3.2 g/10 min and 21,000 Pa·s (P4); 2.6 g/10 min and 35,000 Pa·s (P5); and 1.0 g/10 min and 95,000 Pa·s (P6).

For the sake of comparison, the respective IV values, MFRs, and melt viscosities of commercially available pellets were: 0.72 dl/g, 57 g/10 min, and 70 Pa·s (C1); 0.83 dl/g, 22.7 g/10 min, and 190 Pa·s (C2); 1.0 dl/g, 14 g/10 min, and 220 Pa·s (C3); and 1.19 dl/g, 8.3 g/10 min, and 2,500 Pa·s (C4). In terms of the high-molecular-weight grades, commercially available PETs had melt viscosities lower than that of the pellets of the present invention and were, therefore, of inferior processability.

Production Examples 8 to 11 for Masterbatches
Production Examples of Masterbatches D6 to D11

Using a twin screw extruder, manufactured by Berstorff, having an opening diameter of 43 mm and an L/D ratio of 43 and evacuated by three-stage water-sealing, 70 parts by weight of a clear flake (prepared from recycled PET bottles, having an intrinsic viscosity of 0.725 dl/g and a MFR of 56 g/10 min) produced by Yono PET Bottle Recycle Co., Ltd. dried by hot air at 120° C. for about 12 hours and 30 parts by weight of a PET resin (IV: 0.83, density: 1.35) supplied in a dried bag and produced by Unitika Ltd. were extruded at a set temperature of 260° C., a screw rotation of 200 rpm, a first vent pressure of about −600 mmHg, a third vent pressure of about −670 mmHg, and a self-feeding rate of 30 kg/h. At the same time, 15 parts by weight of an epoxide soybean oil (epoxy plasticizer O-130P produced by Asahi Denka Co., Ltd., epoxy equivalent: 232 g/eq, lemon yellow liquid), which is a polyfunctional epoxy compound having more than two epoxy groups, was injected from the second vent with a metering pump to serve as a binder (Production Example 8, binder masterbatch D6).

In the same manner, 15 parts by weight of an epoxide linseed oil (an epoxy plasticizer O-180A produced by Asahi Denka Co., Ltd., epoxy equivalent: 176 g/eq, light yellow liquid), which is a polyfunctional epoxy compound having more than two epoxy groups was injected with a metering pump to serve as a binder (Production Example 9, binder masterbatch D7). In the same manner, 15 parts by weight of a heat-stable pentafunctional epoxy compound having more than two epoxy groups (a biphenyldimethane epoxy resin, NC 3000S, produced by Nippon Kayaku Co., Ltd., epoxy equivalent of 275 g/eq, light yellow semisolid) was injected with a metering pump to serve as a binder (Production Example 10, binder masterbatch D8).

Five strands extruded from die openings of 3.5 mm in diameter were cooled down in water, and were cut into pellets with a rotary cutter. Each type of resulting pellets in an amount of 50 kg was dried at 140° C. for about 0.5 hours and subsequently at 120° C. for about 12 hours by hot air, and then preserved in a moisture-proof bag.

On the other hand, 50 parts by weight of toluene and 50 parts by weight of a mixture containing 70 parts by weight of difunctional ethylene glycol diglycidyl ether and 30 parts by weight of trifunctional trimethylolpropane triglycidyl ether were mixed in a stainless vessel to prepare a liquid masterbatch (Production Example 11, binder masterbatch D9).

Examples 7 to 9

Preparation of Pellets of High-molecular-weight Polyester Resins (P7 to P9) by Adding Any One of Binder Masterbatches D6 to D9 Containing 100 Parts by Weight of Polyfunctional Epoxy Compounds and Composite Catalyst Masterbatch G1

Three types of materials were mixed in a tumbler. The materials were 100 parts by weight of undried clear flakes (prepared from recycled PET bottles, having an intrinsic viscosity of 0.725 dl/g and a MFR of 56 g/10 min, quality specification: respectively under 30 ppm of aluminium and metals, 40 ppm of a PVC flakes, 450 ppm of pigment flakes, 30 ppm of polyolefin, and 90 ppm of a label and others) produced by Yono PET Bottle Recycle Co., Ltd., 10 parts by weight of any one of the binder masterbatches (D6 to D8) of respective Production Examples 8 to 10, and 1.0 parts by weight of the composite catalyst masterbatch (G1) of Production Example 6 containing 50 parts by weight of lithium stearate, 50 parts by weight of sodium stearate, and 100 parts by weight of calcium stearate. While samples were being extruded at a set temperature of 280° C., a screw rotation of 100 rpm, a first vent pressure of about −755 mmHg, a second and third vent pressure of about −750 mmHg, and a self-feeding rate of 15 kg/h with a twin screw extruder PCM-46 manufactured by Ikegai Corporation having a diameter of 46 mm and an L/D ratio of 35 and evacuated by three-stage oil-sealing, five strands from die openings of 3 mm in diameter were cooled down in water, and were cut into pellets with a rotary cutter. Each type of resulting pellets in an amount of 20 kg was dried by hot air at 120° C. for about 12 hours, and preserved in a moisture-proof bag.

The MFRs of the respective types of the resulting high-molecular-weight PET resin pellets were 18 g/10 min (P7), 15 g/10 min (P8), and 10 g/10 min (P9).

Comparative Examples 1 to 3

Preparation of PET Resin Pellets Having a Middle Long-chain Branches by Using a Single Catalyst and Binder Masterbatch D2 Containing 75% by Weight of a Difunctional Epoxy Compound and 25% by Weight of a Trifunctional Epoxy Compound, Without Using Composite Catalyst Masterbatch G1

Under the same conditions as in Example 3, composite catalyst masterbatch G1 was replaced with 0.1 parts by weight of lithium stearate (Comparative Example 1), 0.1 parts by weight of sodium stearate (comparative Example 2), or 0.1 parts by weight of calcium stearate (Comparative Example 3). The MFR of Comparative Example 1, in which lithium stearate was used, was as low as expected, but strands were liable to cut off seriously. The MFR of Comparative Example 2, in which sodium stearate was used, was lower than expected, but strands can be drawn. However, the resulting pellets were undesirably colored yellow. The MFR of Comparative Example 3, in which calcium stearate was used, was far lower than expected, and it was difficult to draw strands. However, the resulting pellets were advantageously colored white. Therefore, composite catalyst masterbatch G1 containing these three types of catalysts reduces the MFR as well as expected and facilitates the drawing of strands, with a high level of safety. The resulting pellets are advantageously less colored, and barely cause gels to by-produce.

Example 10

Preparation of Pellets of a PET Resin (P10) Having a Low MFR and a Middle Long-chain Branches by Adding Liquid Binder Masterbatch D9 Containing 70% by Weight of a Difunctional Epoxy Compound and 30% by Weight of a Trifunctional Epoxy Compound and a Catalyst, and by Long-Period Operation Using a tumbler, 100 parts by weight of undried clear flakes (prepared from recycled PET bottles, having an intrinsic viscosity of 0.726 dl/g and an MFR of 52 g/10 min) produced by With PET Bottle Recycle Co., Ltd. and composite catalyst masterbatch G1 containing 0.1 parts by weight of lithium stearate, 0.05 parts by weight of sodium stearate, and 0.05 parts by weight of calcium stearate were mixed. A twin screw extruder manufactured by Ikegai Corporation was used which has an opening diameter of 70 mm and an L/D ratio of 37 and is evacuated by three-stage oil-sealing and which was set at a temperature of 280° C., a screw rotation of 100 rpm, a first vent pressure of about −755 mmHg, a third vent pressure of about −750 mmHg, and a self-feeding rate of 50 kg/h. While liquid binder masterbatch D9 was injected into a second vent with a metering pump at a rate of 7.5 kg/h (effective content: 7.5 parts by weight), continuous granulation were performed for three days. A PET resin (P10) having a MFR of 1 to 2 g/10 min and middle long-chain branches was stably produced.

Comparative Example 10

In substantially the same manner as Example 10, while, instead of liquid binder masterbatch D9, a raw binder mixture containing 70 parts by weight of difunctional ethylene glycol diglycidyl ether and 30 parts by weight of trifunctional trimethylolpropane triglycidyl ether was injected into a second vent at a rate of 3.75 kg/h (effective content: 7.5 parts by weight) with a metering pump, continuous granulation were performed for three days. The injection line was clogged in the second day. In advance of this, a pulsing stream of strands and by-production of dark brown gel occurred. This twin screw extruder was overhauled, and dark brown burnt deposit was found at the second vent and dark brown gel was found in the vicinity of the third vent. Also, the liquid binder vaporized was condensed in the oil trap of the vacuum line of the third vent.

Production Example 12

Production Example of Catalyst Masterbatch G3

Using a twin screw extruder, manufactured by Berstorff, having a opening diameter of 43 mm and an L/D ratio of 43 and evacuated by three-stage water-sealing, 50 parts by weight of low-density polyethylene (J-REX F124Z produced by Japan Polyolefins Co., Ltd., MI: 0.4) of clear flakes (prepared from recycled PET bottles, having a intrinsic viscosity of 0.725 dl/g and a MFR of 56 g/10 min) produced by Yono PET Bottle Recycle Co., Ltd.; 50 parts by weight of ethylene-acrylate copolymer (J-REX•EEA A1100 produced by Japan Polyolefins Co., Ltd., MI: 0.4); and a composite catalyst containing 2.5 parts by weight of lithium stearate, 2.5 parts by weight of manganese acetate, and 5.0 parts by weight of calcium stearate were mixed in a tumbler (Production Example 12, composite catalyst masterbatch G3). While the sample was being extruded at a set temperature of 260° C., a screw rotation of 200 rpm, a first vent pressure of about −630 mmHg, a third vent pressure of about −730 mmHg, and a self-feeding rate of 30 kg/h, five strands from die openings of 3.5 mm in diameter were cooled down in water, and were cut into pellets with a rotary cutter. The resulting pellets in an amount of 10 kg were dried at 140° C. for about 1 hour and subsequently at 120° C. for about 12 hours by hot air, and were then preserved in a moisture-proof bag.

Examples 11 and 12
Formation of Sheets by Carbon-dioxide Foaming From the Pellets of PET Resin P3 Having a Low MFR and a High Long-chain Branches, or From a Synthesized PET Resin Corresponding to PET Resin P3

In Example 11, the PET resin pellets(P3) of Example 3 having a low MFR (MFR: 6.5 g/10 min) and a high long-chain branches was used to form sheets by carbon-dioxide foaming. A twin screw extruder (diameter: 60 mm, L/D: 40, vacuumed by two-stage oil sealing) equipped with a carbon-dioxide injector, a gear pump, a circle die (opening diameter: 85 mm, gap: 0.5 mm), a mandrel cooler, and a taking-up device was used. Under the conditions where the twin screw extruder or the like was set at a temperature of 260 to 250° C., a number of screw rotation of 100 rpm, a first vent pressure of about 5 mmHg, a second vent pressure of about 5 to 10 mmHg, and a self-feeding rate of 50 kg/h, while the PET resin (P3) was supplied, 3 parts by weight of carbon dioxide was injected relative to 100 parts by weight of the resin. Thus, foamed sheets having a expanded ratio of 4 times, a foam diameter of 0.5 mm, a thickness of 2 mm, and a width of 600 mm were obtained.

In Example 12, sheets were formed directly from a synthesized PET resin corresponding to the pellets of the PET resin (P3) having a low MFR and a high long-chain branches by carbon-dioxide foaming.

Using a tumbler, 100 parts by weight of an undried clear flakes (prepared from recycled PET bottles, having an intrinsic viscosity of 0.725 dl/g and a MFR of 56 g/10 min) produced by Yono PET Bottle Recycle Co., Ltd., 7.5 parts by weight of the binder masterbatch (D2) of Production Example 2, 2.0 parts by weight of the composite catalyst masterbatch (G3) of Production Example 12 containing 50 parts by weight of lithium stearate, 50 parts by weight of manganese acetate, and 100 parts by weight of calcium stearate, and 2.0 parts by weight of talc particles acting as a nucleation agent were mixed. The operation was performed using the same equipment and under substantially the same conditions as in Example 11. Thus, foamed sheets having a expanded ratio of 4.5 times, a foam diameter of 0.3 mm, a thickness of 2 mm, and a width of 600 mm were obtained.

Example 13
Formation of Pipes From a PET Resin (P11) Having a Low MFR and a High Long-chain Branches Using a tumbler, 100 parts by weight of undried clear flake (prepared from recycled PET bottles, having an intrinsic viscosity of 0.726 dl/g and a MFR of 52 g/10 min) produced by With PET Bottle Recycle Co., Ltd.; 7.5 parts by weight of the binder masterbatch (D3) of Example 3; 2.5 parts by weight of talc; and 1.1 parts by weight of the composite catalyst masterbatch (G2) containing 5.0 parts by weight of lithium stearate and 5.0 parts by weight of calcium stearate were mixed. A twin screw extruder for the first stage having an opening diameter of 46 mm and an L/D ratio of 35, evacuated by three-stage oil-sealing, and being set at a temperature of 280° C., a screw rotation of 100 rpm, a first vent pressure of about −755 mmHg, a second and third vent pressure of about −690 mmHg, and a self-feeding rate of 30 kg/h; a single screw extruder for the second stage having an opening diameter of 65 mm and an L/D ratio of 25, being set at a temperature of 270° C., a screw rotation of 50 rpm; and a circle die of 50 mm having a lip gap of 1.5 mm were used to perform horizontal extrusion and water cooling. Thus, pipes having an external diameter of 50 mm were obtained.

Example 14
Formation of Injection-molded Articles From a Pet Resin (P1) Having a Middling Molecular Weight and a Low Long-chain Branches and a Recycled PET Flake Using an injection molding apparatus equipped with a twin screw extruder, a small container was formed by injection molding from 50 parts by weight of a PET resin (P1) having a middling molecular weight and a low long-chain branches and 50 parts by weight of a PET flake collected from a compressed air molding factory for A-PET sheets.

INDUSTRIAL APPLICABILITY

By applying the masterbatch method of the present invention, the PET-based polyester of the present invention can be allowed to react uniformly in long period operation. Since a uniform reaction resin having a high molecular weight and a high melt viscosity and degree of swelling can be obtained, a high-quality articles can be achieved. The resulting articles has excellent mechanical properties such as thermal stability and tensile strength, and it can be advantageously used as films, sheets, foamed materials, pipes, cushioning, heat insulators, packaging materials, food containers, partition plates, and the like in many industrial fields, such as civil engineering and construction, electrical and electronic, automotive, commodity, packing, and food packing industries. Also, a large amount of recycled PET bottles generated in large quantity can effectively be used as a prepolymer, and this is advantageous to society. In addition, the combustion heat value is as low as half the combustion heat value of polyethylene and polypropylene when the resin is burned after use, and therefore incinerators are less damaged and toxic gases are not generated.

What is claimed is:

1. A masterbatch method for producing a polyester resin, comprising the step of allowing materials to react uniformly at a temperature equal to or greater than the melting point of a polyester A, the materials comprising:
   (1) 100 parts by weight of saturated straight-chain polyester A;
   (2) 1 to 10 parts by weight of binder masterbatch D comprising: 10 to 5 parts by weight of a mixture acting as a binder containing 0 to 100 parts by weight of a compound having two epoxy groups in the molecule thereof and 100 to 0 parts by weight of a compound having an average number of epoxy groups of 2.1 or more; and 100 parts by weight of base substance C; and
   (3) 0.25 to 10 parts by weight of catalyst masterbatch G comprising: 5 to 25 parts by weight of a metal carboxylate acting as coupling reaction catalyst E; and 100 parts by weight of base substance F, whereby the melt viscosity of the polyester increases so that the melt flow rate (MFR) is 50 g/10 min or less at 280° C. and under a load of 2.16 kgf in accordance with condition 20 of JIS K 7210, and the degree of swelling of the polyester increases to between 5% and 200%.

2. A masterbatch method for processing an article, comprising the steps of molding a polyester resin prepared by the method according to claim 1 into pellets in advance; and molding the pellets into the articles.

3. A masterbatch method for processing an article, comprising the step of introducing a polyester resin prepared by the method according to claim 1 to a die or a mold to form the articles immediately after the reaction of claim 1.

4. A masterbatch method for producing a polyester resin or an article of the polyester resin according to claim 1, wherein saturated straight-chain polyester A is a polyethylene terephthalate-based aromatic polyester having an intrinsic viscosity in the range of 0.50 to 0.90 dl/g when the intrinsic viscosity is measured at 25° C. after the polyethylene terephthalate-based aromatic polyester is dissolved in 1,1,2,2-tetrachloroethane:phenol (1:1) solvent mixture.

5. A masterbatch method for producing a polyester resin or an article of the polyester resin according to claim 1, wherein saturated straight-chain polyester A is a recycled material prepared from collected polyethylene terephthalate-based aromatic polyester articles.

6. A masterbatch method for producing a polyester resin or an article of the polyester resin according to claim 1, wherein the compound having two epoxy groups in the molecule thereof contained in binder B of binder masterbatch D contains at least one selected from the group consisting of alkylene glycol diglycidyl ether, poly alkylene glycol diglycidyl ether, alicyclic hydrogenated bisphenol A diglycidyl ether, and aromatic bisphenol A diglycidyl ether and early condensates of bisphenol A diglycidyl ether.

7. A masterbatch method for producing a polyester resin or an article of the polyester resin according to claim 1, wherein the compound having an average number of epoxy groups of 2.1 or more contained in binder B of binder masterbatch D contains at least one selected from the group consisting of: aliphatic trimethylolpropane triglycidyl ether, glycerin triglycidyl ether, epoxide soybean oil, and epoxide linseed oil; heterocyclic triglycidyl isocyanurate; and aromatic phenol novolac epoxy resins, cresol novolac epoxy resins, and bisresorcinol tetraglycidyl ether.

8. A masterbatch method for producing a polyester resin or an article of the polyester resin according to claim 1, wherein base substance C of binder masterbatch D contains at least one selected from the group consisting of a polyethylene terephthalate-based aromatic polyester having an intrinsic viscosity in the range of 0.50 to 0.90 dl/g when the intrinsic viscosity is measured at 25° C. after the polyethylene terephthalate-based aromatic polyester is dissolved in 1,1,2,2-tetrachloroethane:phenol (1:1) solvent mixture, a recycled material prepared from collected polyethylene terephthalate-based aromatic polyester articles, condensates of ethylene glycol, cyclohexanedimethanol, and terephthalic acid, polyethylene acrylate resins, and toluene.

9. A masterbatch method for producing a polyester resin or an article of the polyester resin according to claim 1, wherein coupling reaction catalyst E of catalyst masterbatch G is a composite containing at least two selected from the group consisting of lithium salts, sodium salts, potassium salts, magnesium salts, calcium salts, zinc salts, and manganese salts of stearic acid and acetic acid.

10. A masterbatch method for producing a polyester resin or an article of the polyester resin according to claim 1, wherein base substance F of catalyst masterbatch G contains at least one selected from the group consisting of a polyethylene terephthalate-based aromatic polyester having an intrinsic viscosity in the range of 0.50 to 0.90 dl/g when the intrinsic viscosity is measured at 25° C. after the polyethylene terephthalate-based aromatic polyester is dissolved in 1,1,2,2-tetrachloroethane:phenol (1:1) solvent mixture, a recycled material prepared from collected polyethylene terephthalate-based aromatic polyester articles, condensates of ethylene glycol, cyclohexanedimethanol, and terephthalic acid, and polyethylene acrylate resins.

11. A masterbatch method for producing polyester resin pellets, comprising the steps of: melting (1) undried saturated straight-chain polyester A at a temperature more than or equal to the melting point thereof while performing dehydration by degassing to a pressure of $13.3 \times 10^3$ Pa or less in a non-water-sealed vacuum line; allowing (2) binder masterbatch D and (3) coupling reaction catalyst masterbatch G to uniformly react together by heating, so that the resulting polyester resin has a melt flow rate (MFR) of 50 g/10 min or less at a temperature of 280° C. under a load of 2.16 kgf in accordance with condition 20 of JIS K 7210, and has a degree of swelling of 5% to 200%; and pelletizing the resulting polyester resin.

12. A masterbatch method for producing an article, comprising the steps of: melting (1) undried saturated straight-chain polyester A at a temperature more than or equal to the melting point thereof while performing dehydration by degassing to a pressure of $13.3 \times 10^3$ Pa or less in a non-water-sealed vacuum line; allowing (2) binder masterbatch D and (3) coupling reaction catalyst masterbatch G to uniformly react together by heating, so that the resulting polyester resin has a melt flow rate (MFR) of 50 g/10 min or less at a temperature of 280° C. under a load of 2.16 kgf in accordance with condition 20 of JIS K 7210, and has a degree of swelling of 5% to 200%; and introducing the resulting polyester to a die or a mold to form the article immediately after the foregoing reaction.

* * * * *